US006994481B2

(12) United States Patent
Chi et al.

(10) Patent No.: US 6,994,481 B2
(45) Date of Patent: Feb. 7, 2006

(54) MANUFACTURING METHOD AND APPARATUS OF FIBER COUPLER

(75) Inventors: Sien Chi, Hsinchu (TW); Shiao-Min Tseng, Hsinchu (TW); Nan-Kuang Chen, Sinjhuang (TW)

(73) Assignee: National Chiao Tung University, Hsinchu (TW)

( * ) Notice: Subject to any disclaimer, the term of this patent is extended or adjusted under 35 U.S.C. 154(b) by 157 days.

(21) Appl. No.: 10/729,319

(22) Filed: Dec. 5, 2003

(65) Prior Publication Data

US 2004/0120661 A1 Jun. 24, 2004

(30) Foreign Application Priority Data

Dec. 6, 2002 (TW) .............................. 91135490 A
Nov. 27, 2003 (TW) .............................. 92133398 A

(51) Int. Cl.
*G02B 6/255* (2006.01)

(52) U.S. Cl. ........................... 385/96; 385/95; 385/147

(58) Field of Classification Search ............ 385/95–99, 385/122–126, 141–147
See application file for complete search history.

(56) References Cited

U.S. PATENT DOCUMENTS

| | | | | |
|---|---|---|---|---|
| 5,781,675 A | 7/1998 | Tseng et al. | .................. | 385/30 |
| 5,999,684 A | 12/1999 | Bloom | ....................... | 385/137 |
| 6,018,965 A | 2/2000 | Bloom | ........................ | 65/378 |
| 6,385,372 B1 | 5/2002 | Yang | ........................... | 385/43 |
| 6,392,789 B1 | 5/2002 | Paek et al. | ............... | 359/341.1 |
| 6,631,234 B1 * | 10/2003 | Russell et al. | .............. | 385/125 |
| 2002/0136508 A1 | 9/2002 | Donno et al. | ................. | 385/98 |

FOREIGN PATENT DOCUMENTS

| | | |
|---|---|---|
| TW | 360807 | 7/1997 |
| TW | 448323 | 6/2000 |
| TW | 493090 | 7/2001 |

OTHER PUBLICATIONS

Matthew N. McLandrich, et al., "Polarization Independent Narrow Channel Wavelength Division Multiplexing Fiber Couplers for 1.55 μm", Apr. 1991, Journal of Lightwave Technology, vol. 9, No. 4, pp. 442-447.

B.S. Kawasaki , K.O. Hill, and R.G. Lamont, "Biconical-Taper Single Fiber Coupler", Jul. 1981 Optics Letter, vol. 6, No. 7, pp. 327-328.

Michael Digonnet and H.J. Shaw, "Wavelength Multiplexing In Single-Mode Fiber Couplers" Feb. 1983, Applied Optics, vol. 22, No. 3, pp. 484-491.

Ssu-Pin Ma and Shiao-Min Tseng, "High-Performance Side-Polished Fibers and Applications as Liquid Crystal Clad Fi8ber Polarizers", Aug. 1997, Journal of Lightwave Technology, vol. 15, No. 8, pp. 1554-1558.

(Continued)

*Primary Examiner*—Phan T. H. Palmer
(74) *Attorney, Agent, or Firm*—Volpe and Koenig, P.C.

(57) ABSTRACT

A manufacturing apparatus and method of a fiber coupler is provided. A movable electric arc is employed to fuse more than two stacked fibers for manufacturing a fiber coupler having a small size and good environment stability. It is advantageous that the fiber coupler can be used in a SDH (Synchronous Digital Hierarchy) communication system, and the method also be used to manufacture the all-fiber CWDM (Coarse Wavelength Division Multiplexing) multiplexer which covers the E-band wavelengths and the sub-components of the OADM (Optical Add/Drop Multiplexer). And, all these functions are difficult to be achieved by the conventional techniques.

17 Claims, 7 Drawing Sheets

OTHER PUBLICATIONS

Hussey, C.D. and Minelly, J.D., "Optical Fibre Polishing With a Motor-Driven Polishing Wheel", Jun. 1998, Electronics Letters, vol. 24, No. 13, pp. 805-807.

C. V. Cryan and C. D. Hussey, "Fused Polished Singlemode Fibre Couplers", Jan. 1991 Electronics Letter, vol. 28 No. 2, pp. 204-205.

W. Shin, U.C. Ryu and K. Oh, "OH Absorption-Induced Loss in Tapered Singlemode Optical Fibre", Feb. 2002, Electronics Letters, vol. 38, No. 5, pp. 214-215.

C.V. Cryan, M. O. Donnchadha, J.M. Lonergan and C. D. Hussey, "Fused Polished Polarization-Maintaining Fibre Couplers", Apr. 1992, Electronics Letters, , pp. 857-858.

N. K. Chen, S. Chi, and S.M. Tseng, "Fused-polished fiber couplers", Oct. 2003 Proceedings of OECC'2003, vol. 23, pp. 299-300.

* cited by examiner

MANUFACTURING METHOD AND APPARATUS OF FIBER COUPLER

FIELD OF THE INVENTION

This invention relates to a manufacturing method and apparatus of a fiber coupler, and more particularly to a micro-fiber coupler with a very small size.

BACKGROUND OF THE INVENTION

Fiber coupler, so called fiber splitter, is an element to separate a light signal from one fiber into multiple fibers. Nowadays, the kinds of the fiber coupler are quite complex because there exists many different demands when being applied in the communication.

When being classified on function, the variety of the fiber coupler can be classified into one by one, one by two and one by N types, etc. And, if being differentiating from the manufacturing method, it can be distinguished into the fused-biconical-tapering and the side-polishing techniques. However, the principles thereof are both based on the evanescent wave coupling method.

In 1981, Kawasaki firstly disclosed a manufacturing method for a biconic tapering single mode fiber coupler, which is still widely adopted now. This method employs a butane-oxygen flame to heat the adjacent un-jacketed fibers and, simultaneously, the fibers are axially elongated and gradually fused while the mode field can thus be getting closer. Since the core mode of the fiber gradually loses the light guiding effect because the core is getting thinner and thinner, the guiding mode thereof will transfer into cladding modes and optical coupling will be occurred between the two fibers. Finally, the fusion will be stopped while a desired splitting ratio of the fibers is achieved through the heating and pulling. Furthermore, the fused region will be sealed in a fillister on a quartz substrate and finally sleeved by a stainless steel cube.

However, in this method, the limitation is that it has a difficulty to raise the temperature of the butane-oxygen flame up to 1500° C. Therefore, when the fibers are heated by the flame, they must simultaneously be mechanically pulled to reduce the fusion point for facilitating the fusion therebetween. At this time, the core of the fiber is so thinned that the effect thereof will be lost, and the mode field will be coupled through expanding the evanescent field to the other fiber. Now, a new core is formed at the fused region which employs the air as a new cladding. Furthermore, the whole fiber fusion region will display a structure similar to a dumbbell.

Nevertheless, because of this dumbbell-like structure, the polarization birefringence effect might be easily induced thereinto. In addition, because the diameter of the fusion region is only about 30 micrometers left, the angle formed as pulling the fiber during fusion should be slowly changed for achieving the adiabatic state of the energy. However, it still can not avoid a drawback of the multi-modes excitation. Besides, because the width of flame is about 5 mm which actually causes the heating region too wide, the pulled fiber might be dropped and deformed due to the gravity. The local air flow and the moisture induced by the flame will also degrade the fiber.

Thus, if an excellent fiber coupler is needed, for example, a narrow band fiber multiplexer/demultiplexer, the elongation length must be longer. However, a long elongation actually will result in an increase of the optical loss and a reduction of the mechanical strength. At the same time, the polarization birefringence effect will accumulate more seriously so as to cause a worse channel isolation. Moreover, hydroxyl ions produced as the flame is combusting will also diffuse into the fiber when heating and pulling thereof so as to cause a seriously loss at the wavelength of around 1.38 μm.

Therefore, this method is not suitable for making the narrow band fiber multiplexer/demultiplexer, the polarization-critical fiber components, E-band component which covers the wavelength of around 1.38 μm, and the components for S-band Raman Amplifier.

Because of the technical disadvantages described above, the applicant keeps on carving unflaggingly to develop a "manufacturing method and apparatus of fiber coupler" through wholehearted experience and research.

Thus, it is an object of the present invention to provide a manufacturing method and apparatus for coupling more than two stacked fibers respectively having an exposed or unexposed evanescent field thereof.

It is another object of the present invention to provide an apparatus employs a movable electric arc for fusing the stacked fibers.

It is a further object of the present invention to provide a manufacturing method and apparatus for a micro-fiber coupler with a super stability.

SUMMARY OF THE INVENTION

According to an aspect of the present invention, a manufacturing method of a fiber coupler includes steps of (a) providing at least a first fiber and a second fiber and stacking the fibers together for forming a stacking region, and (b) fusing the stacking region through an electric arc for forming the fiber coupler.

Preferably, the step (a) further includes steps of (a1) forming a first evanescent field exposed surface on the first fiber, and (a2) stacking the first evanescent field exposed surface with the second fiber so as to form the stacking region.

Preferably, the step (a1) further includes a step of: forming a second evanescent field exposed surface on the second fiber, and the step (a2) further includes a step of stacking the first evanescent field exposed surface with the second evanescent field exposed surface fixedly together for forming the stacking region.

Moreover, the first and the second evanescent field exposed surfaces respective of the first and the second fibers are formed by a polishing method, or a laser-paring method.

Preferably, the step (b) further includes a step of cleaning the stacking region by the electric arc through adjusting a temperature thereof before fusing the stacking region.

Preferably, the step (b) further includes a step of: surrounding the stacking region by a gas while fusing the stacking region.

Preferably, the step (b) further includes a step of: adjusting an elongation length of the stacking region while fusing the stacking region.

Preferably, the step (b) further includes a step of: annealing the stacking region through adjusting a temperature of the electric arc after fusing the stacking region.

In accordance with another aspect of the present invention, a manufacturing apparatus of a fiber coupler having at least two fibers includes a pedestal, at least a fixing unit located on the pedestal for fixedly stacking the at least two fibers together to form a stacking region, and a discharging unit located on the pedestal for producing an electric arc, wherein the stacking region is fused by the electric arc so as to form the fiber coupler.

Preferably, the fixing unit is made of a material selected from a group consisting of a semiconductor material such as silicon, a metal, a metal complex, a glass, a ceramics, and a macromolecular material, and the discharging unit is movable.

Preferably, the discharging unit further includes a pair of electrodes which are position adjustable, wherein the electrodes are made of a material selected from a group consisting of a tungsten, a molybdenum, a titanium, a tantalum, a chromium, a nickel, a vanadium, a zirconium, a hafnium, a platinum, a molybdenum disilicide, a tungsten carbide, a titanium diboride, a hafnium diboride, a hafnium carbide, a niobium, a niobium diboride, a niobium carbide, a tungsten disilicide, a stainless steel, and an alloy thereof.

Preferably, the fixing unit further includes a regulating element for adjusting an elongation length of the fused region.

Preferably, the manufacturing apparatus further includes a controller for controlling the regulating element and the discharging unit.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
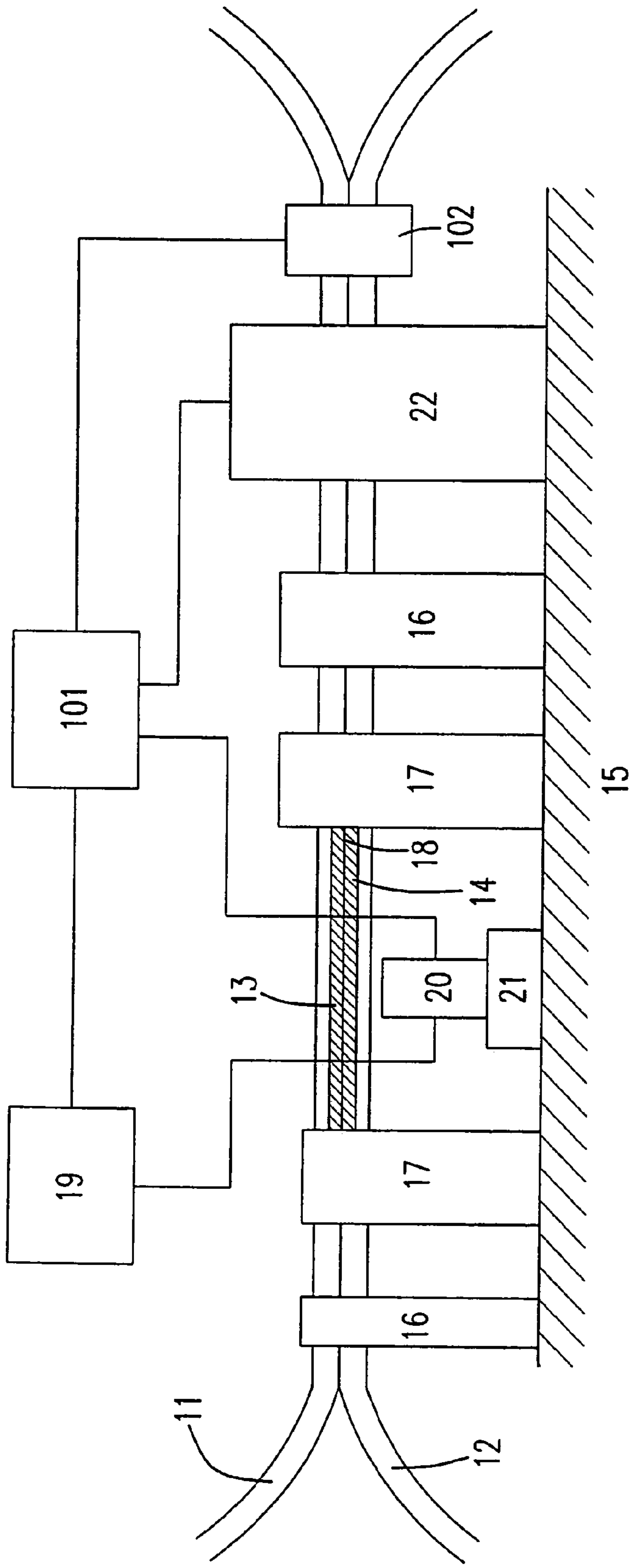
FIG. 1 is a structural schematic view showing a manufacturing apparatus of a fiber coupler in a preferred embodiment according to the present invention.

Please refer to FIG. 1 which illustrates a structural schematic view of a manufacturing apparatus of a fiber coupler in a preferred embodiment according to the present invention. The manufacturing apparatus of the fiber coupler 1 includes a pedestal 15, a first set of fixing unit 16, a second set of fixing unit 17, and a discharging unit 20, wherein the discharging unit 20 is composed of a pair of electrodes. The electrodes are made of a tungsten, a molybdenum, a titanium, a tantalum, a chromium, a nickel, a vanadium, a zirconium, a hafnium, a platinum, a molybdenum disilicide, a tungsten carbide, a titanium diboride, a hafnium diboride, a hafnium carbide, a niobium, a niobium diboride, a niobium carbide, a tungsten disilicide, a stainless steel, or an alloy thereof, and the positions thereof and the distance therebetween are both adjustable. Furthermore, the discharging unit 20 is electrically connected to a power supplying device 19 and supported by a carrying stage 21, wherein the discharging unit 20 is carried by the carrying stage 21 for moving between the second set of fixing unit. Moreover, the discharging unit 20 further includes a regulating element 22, and both the discharging unit 20 and the regulating element 22 are electrically connected to a controller 101 for being controlled thereby.

As comparing with the prior arts, it is advantageous that the manufacturing method and apparatus of a fiber coupler according to the present invention not only can be applied in more than two stacked fibers, but also can directly form an evanescent filed exposed surface for the fibers without polishing or laser-paring thereof. According to the present invention, the evanescent filed exposed surface can be formed by the electric arc produced by the discharging unit 20 and simultaneously a slight pulling applied on the fibers.

Now, for describing the details of the present invention, the descriptions hereafter are focused on two fibers, and however, it is obvious that one skilled in the art can easily derive more embodiments of than two fibers from the embodiment of two fibers.

As shown in FIG. 1, firstly, the first fiber 11 and the second fiber 12 are stacked together up and down through aligning the first evanescent field exposed surface 13 with the second evanescent field exposed surface 14 respectively thereof. Then, the fibers are fixed on the pedestal between the first set of fixing unit 16 and between the second sect of fixing unit 17, so that the stacked first and second evanescent field exposed surfaces form a stacking region 18, wherein the first and the second evanescent field exposed surfaces can be formed through a fiber polishing method or a laser-paring method.

Alternatively, as mentioned above, according to the present invention, the fibers for forming the fiber coupler do not need to be polished or laser-pared before being stacked together. The fibers can be stacked together first and then fused by the electric arc produced by the discharging unit 20 for directly forming the stacking region 18 without forming the evanescent field exposed surfaces in advance.

Figure 2:
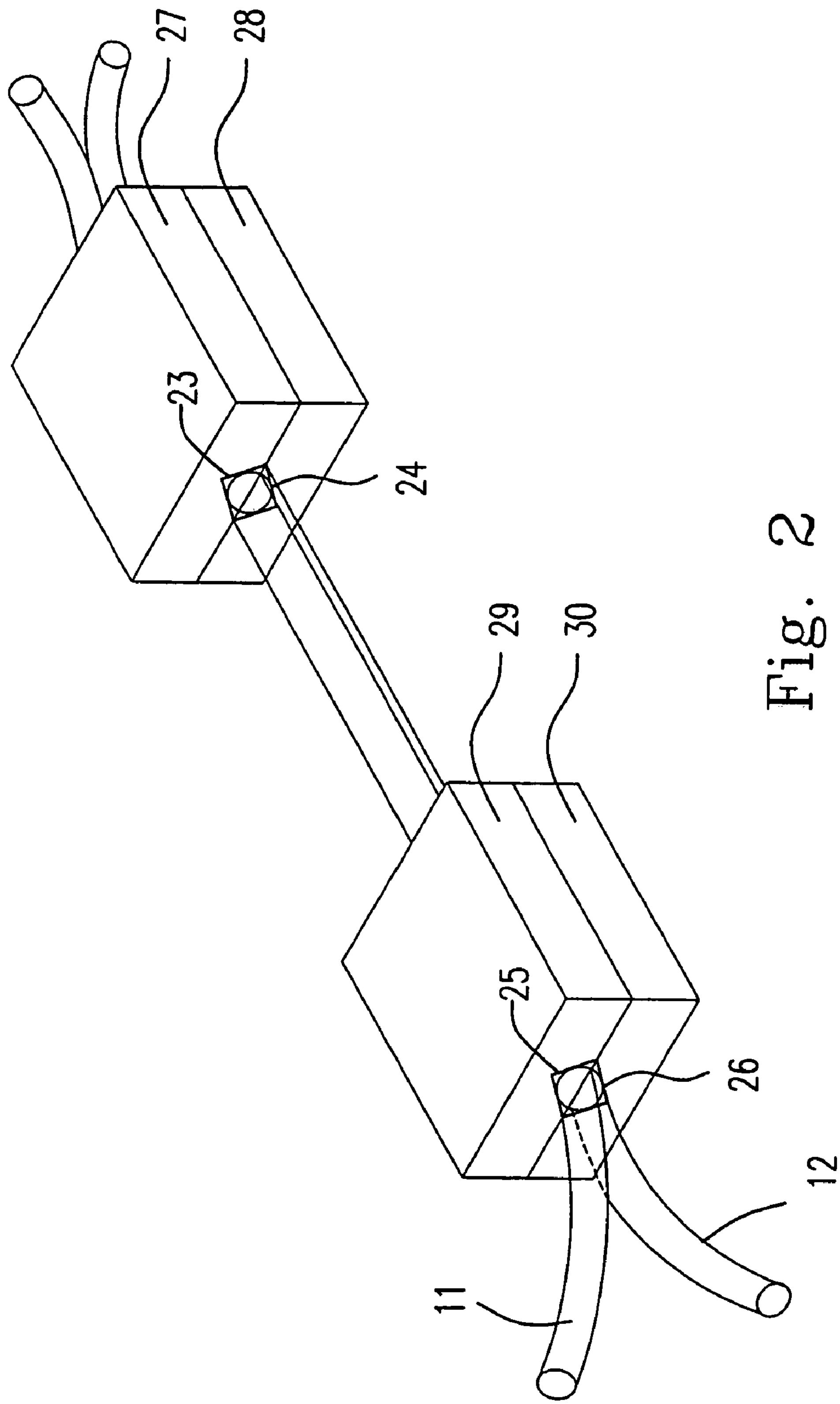
FIG. 2 is a structural schematic view showing a first set of fixing unit 16 as shown in FIG. 1 in a preferred embodiment according to the present invention.

Now, please refer to FIG. 2, which illustrates a structural schematic view of the first set of fixing unit 16 in a preferred embodiment according to the present invention. The first set of fixing unit 16 includes four blocks 27, 28, 29 and 30, and these four blocks 27, 28, 29 and 30 with identical curvature diameters have identical V-shaped grooves 23, 24, 25 and 26 respectively thereon. The V-shaped grooves 23 and 24 of the blocks 27 and 28 are stacked oppositely to each other to form a rhombic space and the V-shaped grooves 25 and 26 of the block 29 and 30 are also stacked oppositely to each other to form the same rhombic space, so that the first and the second fibers 11 and 12 are fixed in the two rhombic spaces.

Figure 3:
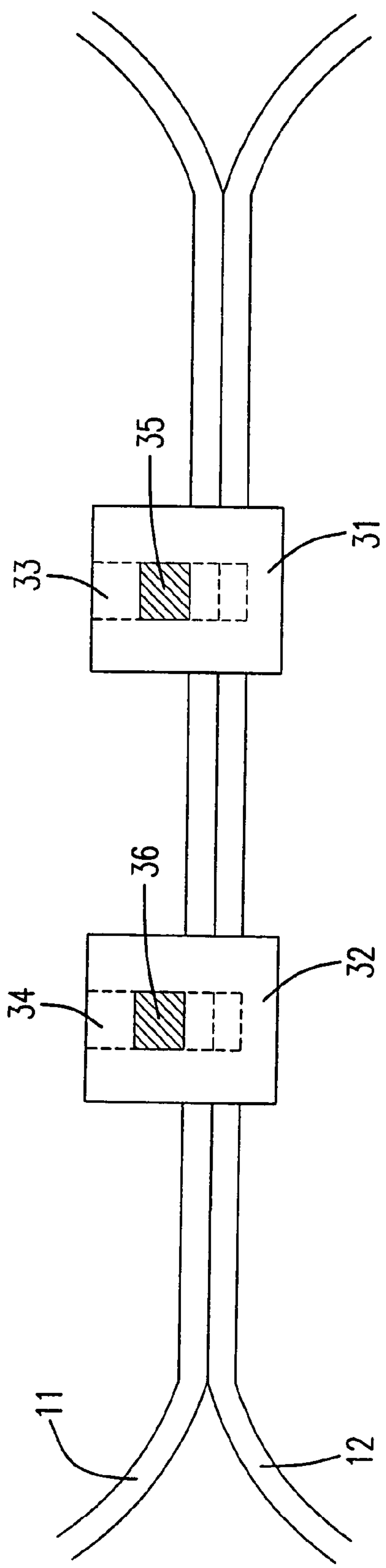
FIG. 3 is a structural schematic view showing a second set of fixing unit 17 as shown in FIG. 1 in a preferred embodiment according to the present invention.
Figure 4:
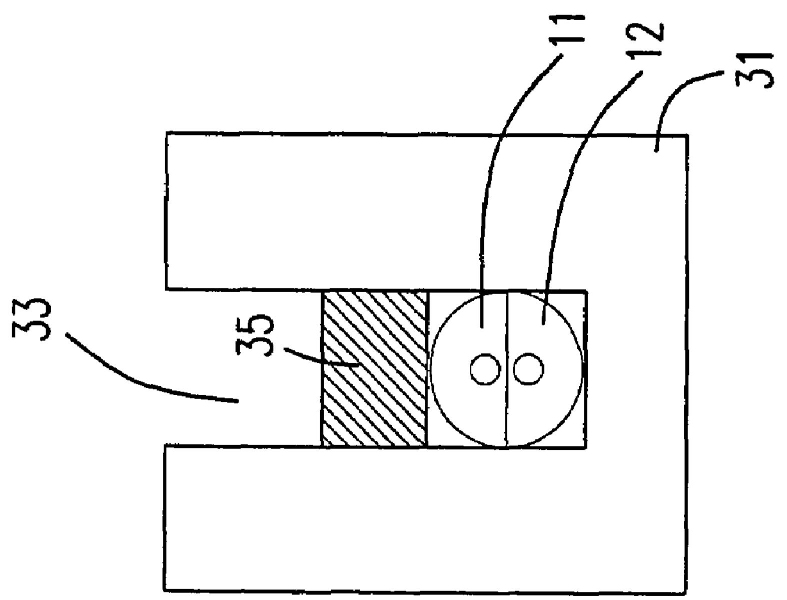
FIG. 4 is a cross-sectional view showing the second set of fixing unit 17 in a preferred embodiment according to the present invention.

Please refer to FIG. 3, which illustrates a sectional drawing of the second set of fixing unit 17 in a preferred embodiment according to the present invention and FIG. 4, which illustrates a magnifying sectional drawing of one of the second set of fixing unit 17 shown in FIG. 1. The second set of fixing unit 17 includes two rectangular blocks 31 and 32 respectively having grooves 33 and 34, and two elements 35 and 36 are positioned therein respectively. Also, the width of the grooves is exactly identical to an outer diameter of a fiber. Here, before fusing, the first and the second fibers 11 and 12 are putteded in the grooves 33 and 34 in a stacked state, and then the elements 35 and 36 are also respectively inset in the blocks above the fibers in an orientation across the fibers for respectively fixing the first and the second fibers through the weight thereof, as shown in FIG. 4, so as to facilitating the fusion.

Preferably, the first set of fixing unit 16 and the second set of fixing unit 17 are made of a semiconductor material such as silicon, a metal, a metal complex, a glass, a ceramics, or a macromolecular material.

Again, please refer to FIG. 1. The detailed manufacturing steps of the present invention will be described below. Firstly, the discharging unit 20 is supplied by a relatively lower voltage from the power supplying device 19 to generate an electric arc having a relatively lower temperature. Then, the electric arc having a relatively lower temperature will cooperate with the carrying stage 21 for cleaning the stacking region 18. Continuously, after completing the cleaning process, the power supplying device 19 then increases the output voltage so as to increase the temperature of the electric arc generated by the discharging unit 20. The temperature increased electric arc then fuses the stacking region 18, and through a back and forth movement of the carrying stage 20, the position of the electric arc will be adjustable so that the position of the stacking region 18 fused by the electric arc can be adjusted, too. At the same time, the adjusting element 22 may pull the fibers for elongating the length of the stacking region 18 so that a splitting ratio of the stacking region 18 will be adjusted to be a desired value. It should be noted that the pulling by the adjusting element 22 is simply employed to adjust the splitting ratio of the stacking region 18 and is totally different from the prior arts which also pull the fiber but to destroy the core of the fiber. Therefore, according to the present invention, the formed fiber coupler will not have a dumbbell-like shape as presented in the prior arts.

Moreover, in addition to synchronously pull the fiber through the adjusting element 22 while the discharging unit 22 is discharging, the present invention also can be proceeded through only pulling the fiber to a specific extent but the discharging element 22 still discharging. Under this asynchronous condition, the dopant of the core will be diffused so as to expand the signal mode field of the fibers, and thus, the effect of optical coupling to another fiber will be enhanced thereby. Through this method, a fiber component with a more strengthened coupling effect can be obtained.

As to the controller 101, it will immediately notice the power supplying device 19 to shut off the power for pause the electric arc when a detector 102, which may locate at the two ends of the fibers, monitors the desired conditions, e.g. the splitting ratio, of the fiber. Thus, this switching can be achieved within a very short time and it is advantageous that the whole process can be monitored and fulfilled automatically, e.g., through a computer system. But, as we know, this control loop can not be achieved by the conventional flame-fusing method because the flame is obviously cannot be started and stopped in an extremely short time. Furthermore, because the fabrication parameters of the whole process are determined by the programs set inside the controller 101, the quality and yield can therefore be improved significantly. By contrast, the conventional flame-fusing method only employs one single set of process parameters for fusing through and through, and therefore, once a fiber pulling force or the cleanness is different, the result will become different and can not be consistent to the specification. Consequently, the technique according to the present invention can achieve an extremely high throughput for the fiber coupler so as to substantially reduce the cost in producing and the price in the market.

In addition, although the adjusting element 22 is independently mounted outside the first set and the second set of fixing units 16 and 17, it absolutely can be incorporated into the first set of fixing unit 16 or the second set of fixing unit 17 technically.

After fusing, the power supplying device 19 will again drop the output voltage so as to reduce the temperature of the electric arc. Then, the electric arc will turn on an annealing process on the stacking region 18. Finally, it is packaged to fulfill the fiber coupler.

Figure 5:
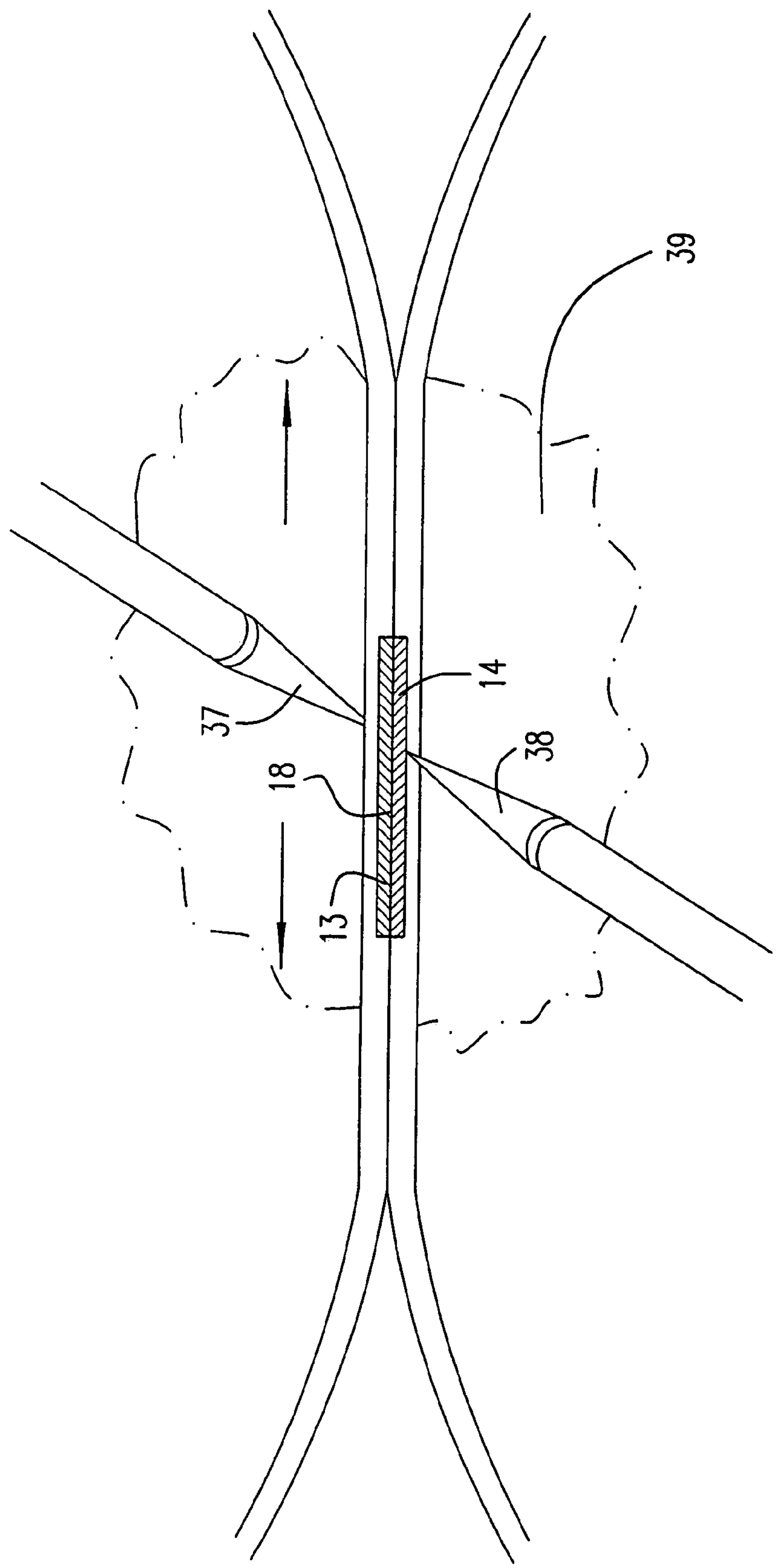
FIG. 5 is a schematic view showing a fusion by a discharging unit 20 in a preferred embodiment according to the present invention.

Please refer to FIG. 5, which illustrates a schematic view of a fusion by a discharging unit 20 in a preferred embodiment according to the present invention. It is worthy noting that in order to smoothly start the arc at the onset of discharging between the electrodes 37 and 38, the output voltage from the power supplying device 19 can firstly be elevated to a transient high voltage to conduct the electrode 37 and 38, and then dropped to an operating voltage immediately. Therefore, the starting electric arc can be released more smoothly so as to provide a stable heating for the sequential fusing processes.

Furthermore, as shown in FIG. 5, when the electric arc fuses the stacking region 18, the stacking region 18 can be surrounded by a purifying gas, e.g., nitrogen or an inert gas, which only needs to conform to the environmental and safe conditions.

Figure 6A:
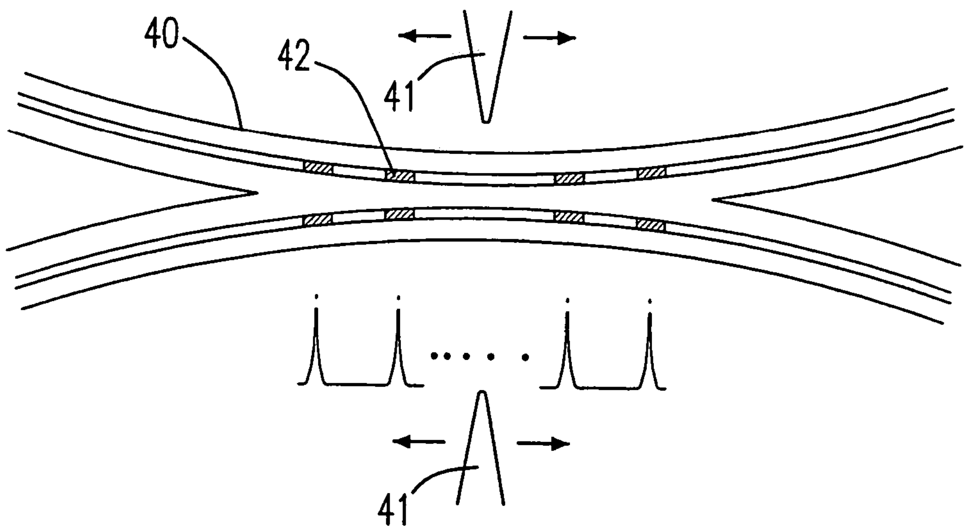
FIGS. 6A~B are schematic views showing a manufacturing apparatus of a fiber coupler in another preferred embodiment according to the present invention.
Figure 6B:
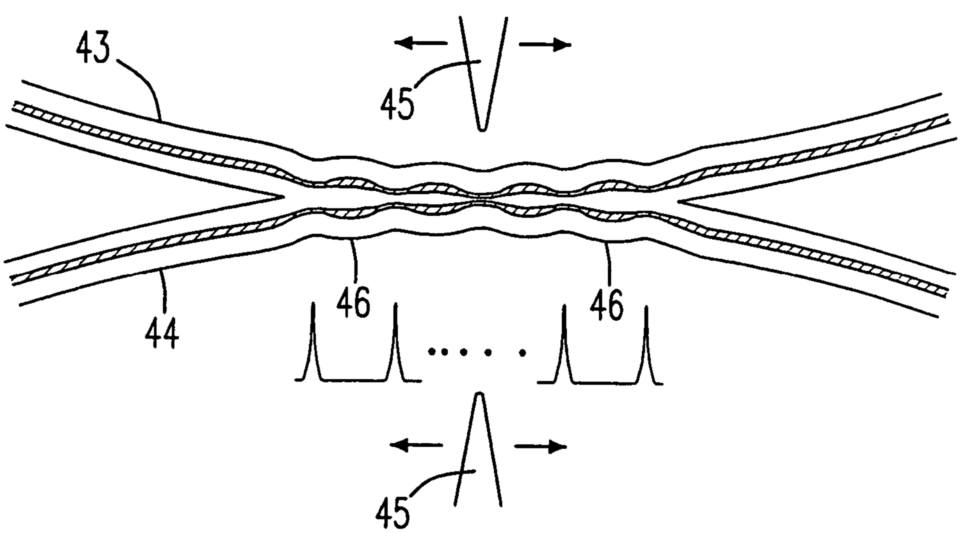

Please refer to FIGS. 6A~6B, which illustrate schematic views of manufacturing the fiber coupler in another preferred embodiment according to the present invention. As shown in FIG. 6A, after the fiber coupler 40 is fused by the electric arc, the electrodes with a fixed distance therebetween can intermittently discharge and simultaneously move along the fiber coupler 40 parallel so as to produce a moving electric arc, and at this time, the fiber is not pulled. As a result, the material structure of portions of the fiber coupler which are fused by the moving electric arc will be influenced by a heat effect so that the refraction index thereof will be changed thereby. Namely, the fiber coupler will therefore own a filtering effect of a fiber grating. The interval of discharging is namely the period of the grating 42.

As shown in FIG. 6B, when the side-polished (or not polished) fibers 43 and 44 are closed together, the electrodes 45 with a fixed distance therebetween can intermittently discharge and simultaneously move along the fibers 43 and 44 parallel so as to produce a moving electric arc. However, the interval of discharging is not necessarily the same. At this time, every intermittently fused portion of the fiber will form a micro-fiber coupler 46, and plural cascaded micro-fiber couplers 46 therefore can achieve a particular splitting ratio, for example, the wavelength splitting curve will approach a square wave but not a conventional sinusoidal wave.

Figure 7A:
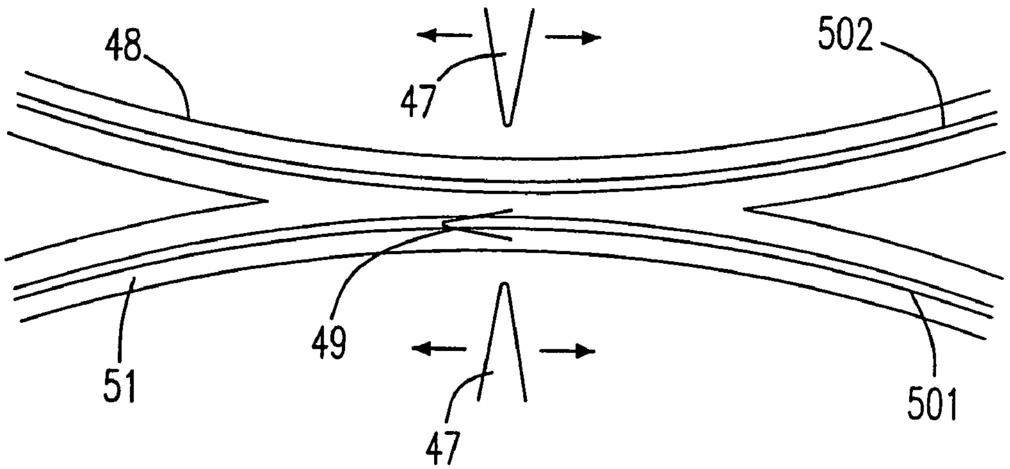
FIGS. 7A~B are schematic views showing a manufacturing apparatus of a fiber coupler in another further preferred embodiment according to the present invention.
Figure 7B:
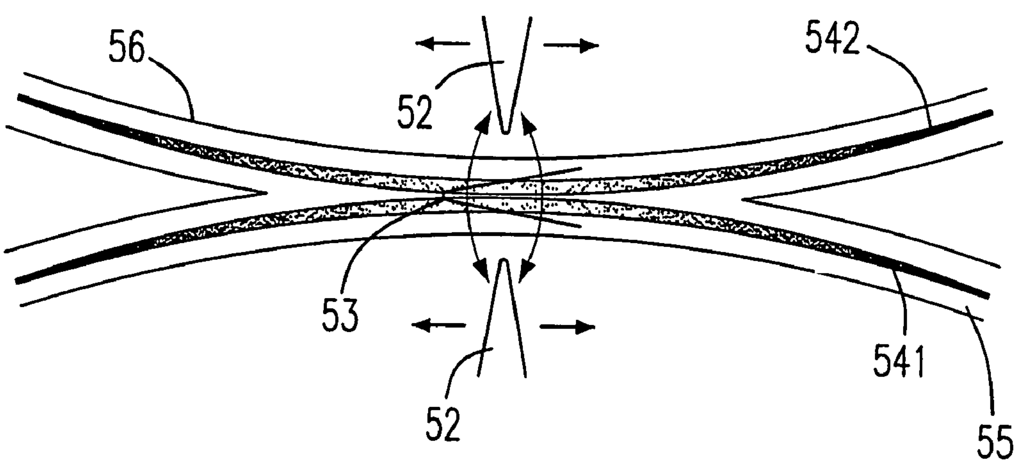

Please refer to FIGS. 7A~7B, which illustrate schematic views of manufacturing the fiber coupler in another further preferred embodiment according to the present invention. As shown in FIG. 7A, firstly, a moving electric arc produced by the electrodes 47 with a fixed distance therebetween is employed to intermittently discharge and simultaneously move along the fibers parallel so that the fibers are slightly pulled and fused to form a fiber coupler 48 having a relatively weaker coupling effect. And, because the pulled and fused length of the fiber coupler is relatively shorter, the signal mode field distribution 49 of the core 501 will not substantially enter the core 502.

As shown in FIG. 7B, firstly, the electric arc produced by the electrodes 52 is located at a fixed position or slowly moved around the fixed position for heating the fibers but the central portion of the fiber coupler 56 is not adjusted or pulled. At this time, a relatively higher temperature of the electric arc will cause the dopants of the cores 541 and 542 to diffuse owing to the heat effect, and thus the signal mode field distribution 53 will also be diffused into the core 52. Therefore, under this condition that the fiber is not pulled to be very long, it can achieve a very strong light coupling, and thus, the volume of the fiber coupler also can remain very small.

In addition, through utilizing the electric arc discharging technique according to the present invention, the fibers can be that one is polished or laser-pared to form the evanescent field exposed surface but the other does not own the evanescent field exposed surface. And, after the two different fibers are stacked, the fibers can be pulled and fused by the electric arc so as to form an asymmetric structure fiber coupler, e.g., a wide band fiber coupler.

In view of the aforesaid, the present invention employs the electric arc to fuse the fibers for forming a fiber coupler and includes the characteristics as followed. Because the temperature of the electric arc is high enough (over 1500° C.), it not only can fuse the fiber directly through the electric arc so as to save the processes of polishing or laser-paring the fiber for forming the evanescent field exposed surface in advance, but also does not necessarily need to simultaneously pull the fiber as heating, as used in the traditional flame-fusing method. Therefore, the mechanical strength of the fiber coupler according to the present invention will significantly exceed that of the conventional one. Furthermore, since the electric arc has a small contact area and a stable heating condition and is movable to adjust the fused region, and the number of fibers can be more than two, the present invention is really a novel and progressive creation and conforms to the demand of the industry.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of a fiber coupler, comprising steps of:

(a) providing at least a first fiber and a second fiber;

(b) forming a first evanescent field exposed surface on said first fiber;

(c) stacking said first evanescent field exposed surface with said second fiber for forming a stacking region; and (d) fusing said stacking region through an electric arc for forming said fiber coupler.

2. The method according to claim 1, wherein said step (b) further comprises a step of: forming a second evanescent field exposed surface on said second fiber.

3. The method according to claim 2, wherein said first and said second evanescent field exposed surfaces respective of said first and said second fibers are formed by a laser ablation method.

4. The method according to claim 2, wherein said step (c) further comprises a step of: stacking said first evanescent field exposed surface with said second evanescent field exposed surface fixedly together for forming said stacking region.

5. The method according to claim 2, wherein said first and said second evanescent field exposed surfaces respective of said first and said second fibers are formed by a polishing method.

6. The method according to claim 1, wherein said step (d) further comprises a step of: annealing said stacking region through adjusting a temperature of said electric arc after fusing said stacking region.

7. The method according to claim 1, wherein said step (d) further comprises a step of: cleaning said stacking region by said electric arc through adjusting a temperature thereof before fusing said stacking region.

8. The method according to claim 1, wherein said step (d) further comprises a step of: surrounding said stacking region by a gas while fusing said stacking region.

9. The method according to claim 1, wherein said step (d) further comprises a step of: adjusting an elongation length of said stacking region while fusing said stacking region.

10. A manufacturing apparatus of a fiber coupler having at least two fibers, comprising: a pedestal;

at least a fixing unit located on said pedestal for fixedly stacking said at least two fibers together to form a stacking region; and a discharging unit located on said pedestal for producing an electric arc, wherein said stacking region is fused by said electric arc so as to form said fiber coupler.

11. The manufacturing apparatus according to claim 10, wherein said fixing unit is made of a material selected from a group consisting of a semiconductor material, a metal, a metal complex, a glass, a ceramics, and a macromolecular material.

12. The manufacturing apparatus according to claim 11, wherein said semiconductor material is a silicon.

13. The manufacturing apparatus according to claim 10, wherein said discharging unit further comprises a pair of electrodes which are position adjustable.

14. The manufacturing apparatus according to claim 13, wherein said electrodes are made of a material selected from a group consisting of a tungsten, a molybdenum, a titanium, a tantalum, a chromium, a nickel, a vanadium, a zirconium, a hafnium, a platinum, a molybdenum disilicide, a tungsten carbide, a titanium diboride, a hafnium diboride, a hafnium carbide, a niobium, a niobium diboride, a niobium carbide, a tungsten disilicide, a stainless steel, and an alloy thereof.

15. The manufacturing apparatus according to claim 10, wherein said fixing unit further comprises a regulating element for adjusting an elongation length of said stacking region.

16. The manufacturing apparatus according to claim 15 further comprising a controller for controlling said regulating element and said discharging unit.

17. The manufacturing apparatus according to claim 10, wherein said discharging unit is movable.

* * * * *